Dec. 13, 1955 R. L. SKINNER 2,726,978
METHOD OF MAKING BEARINGS
Original Filed Dec. 30, 1947
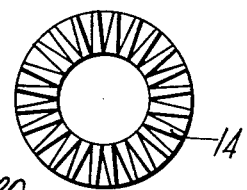
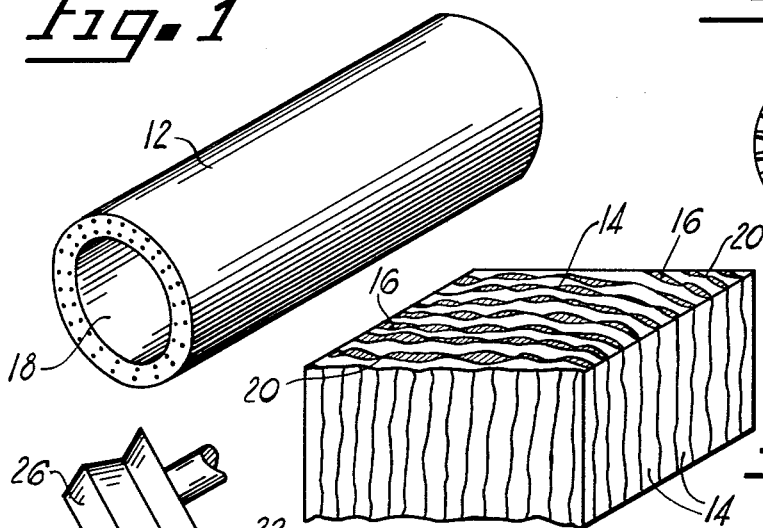
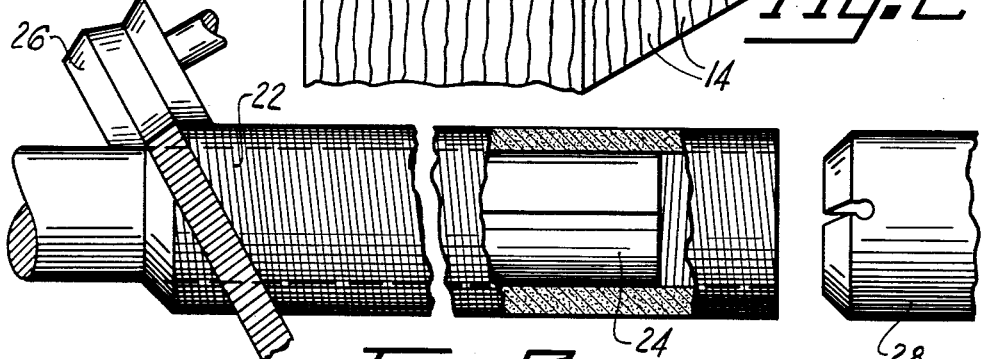
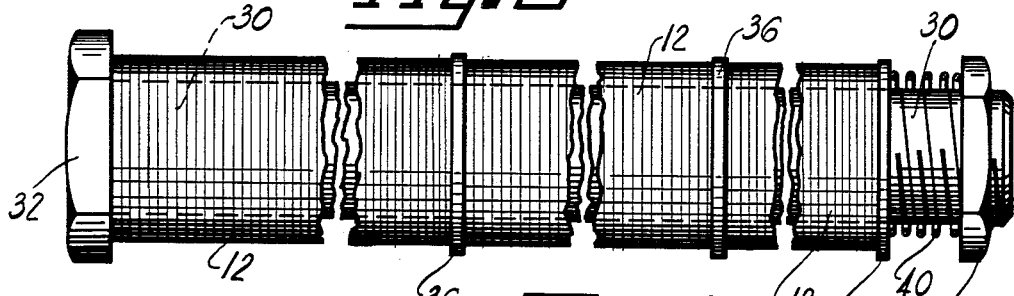
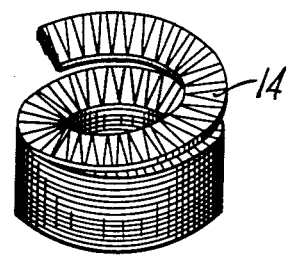
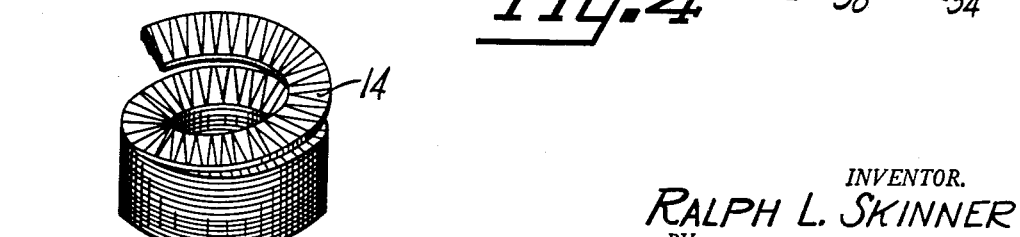
INVENTOR.
RALPH L. SKINNER
BY M. A. Hobbs
ATTORNEY

United States Patent Office 2,726,978
Patented Dec. 13, 1955

2,726,978

METHOD OF MAKING BEARINGS

Ralph L. Skinner, Detroit, Mich., assignor to Bendix Aviation Corporation, South Bend, Ind., a corporation of Delaware Original application December 30, 1947, Serial No. 794,667. Divided and this application August 28, 1951, Serial No. 244,014

7 Claims. (Cl. 154—81)

The present invention relates to bearings and the like, and more particularly to a method of making bearings or articles composed of a plurality of layers bonded together with a synthetic resin. This is a division of my application Serial No. 794,667, filed December 30, 1947, now abandoned.

One of the principal objects of the present invention is to provide a bearing wherein a lubricant is delivered uniformly to a large area of the bearing surface.

Another object of the invention is to provide a relatively light, cheap and long wearing bearing in which a continuous supply of a lubricant is delivered to the bearing surface throughout the operation of the bearing.

Another object of the invention is to provide a simple and efficient oilless bearing having numerous pores radiating from the bearing surface for the retention of a suitable lubricant or antifriction material.

A further object of the invention is to provide a hollow cylindrical member or a segment thereof having numerous radial pores adapted to transfer a fluid through said member to the surface of a foreign object.

Still another object of the invention is to provide a method of making fibrous bearings of the oilless type composed of a plurality of layers bonded together with a synthetic resin.

The aforementioned article, which forms the subject matter of the present invention, consists of a plurality of axially arranged layers of a fibrous material, for example paper or cloth, held together by a noncontinuous bond such that several radial pores or ducts extending from the central portion to the surface of said article are provided between each layer. The number and size of the pores between each layer may be controlled in part by using a material having a predetermined rugosity for making the individual layers. The radial pores may be filled with a lubricant, for example graphite or paraffin, to produce a bearing generally classified as an "oilless" type. The advantages and characteristics of my invention may be more fully understood by referring to the accompanying drawings, wherein:

Figure 1 is a perspective view of an article, such as a bearing, forming the subject matter of the present invention;

Figure 2 is an enlarged perspective view of a segment of the article shown in Figure 1;

Figure 3 is a side elevation of the article shown in Figure 1 illustrating one step in a method of making the article;

Figure 4 is a side elevation of the article illustrating another step in the method of making said article;

Figure 5 is a perspective view of the article after the completion of the step illustrated in Figure 3; and Figure 6 is an end view of one layer of a modified form of my invention.

Referring more specifically to the drawings, numeral 12 designates the body of a bearing or the like which is composed of a plurality of axially arranged layers 14 having radial pores or ducts 16 extending from the hollow internal portion 18 to the surface of said body. These ducts are best seen in the enlarged fragmentary view of the bearing shown in Figure 2. The layers or convolutions are bonded to one another at the points of contact shown at numeral 20. In the use of this structure as a bearing, the radial pores are filled with oil, graphite, paraffin, or any other suitable lubricating material and, during the operation of the bearing, the lubricant gradually flows from these pores onto the bearing surface, forming a continuous uniform film between said surface and the journal.

In a method of producing the bearing or article, sheets of crepe paper or cloth impregnated with a phenolic condensation product are slit transversely of the rugosities into ribbons of a width approximately equal to the thickness of the bearing wall. These ribbons are wound edgewise into a cylindrical element 22, as shown in Figure 3, using a rotatable mandrel 24 for receiving the newly formed cylindrical member and a roller 26 for applying pressure to the forward end of the element as the ribbon is wound onto the mandrel. This roller determines the lateral angle assumed by the ribbon in the final element 22. In the winding operation, the rugosities of the ribbon, which extend substantially transversely thereon, are reduced a slight amount progressively from the inner edge at the mandrel to the outer edge of the ribbon. As the ribbon is wound into place, the cylindrical element 22 moves axially on mandrel 24 and is supported at the outer end by a rotatable member 28 which is adapted to yieldably resist axial movement of element 22 away from roller 26, such as to apply a predetermined pressure on element 22.

The article formed by the steps shown in Figure 3 consists of rather loosely wound unbonded layers held in place after the mandrel has been removed only by the rigidity of the paper or cloth, as illustrated in Figure 5. This loosely wound article is cut into sections of a somewhat greater length than that of the final article. The sections are placed on another mandrel or stem 30 having a head or an abutment 32 on one end and a nut 34 threaded onto the other end. As shown in the drawings, several sections separated from one another by plates or washers 36 may be assembled on one stem. A plate 38 is placed on stem 30 against the end of the last section to be assembled on said stem and is held firmly in place by a spring 40, the tension of which determines the compression on the several sections and consequently the size of the ducts between the convolutions and the degree of porosity of the final article. The stem with the sections assembled thereon is placed in an oven or a fluid, preferably oil, and heated to a temperature and for a time sufficient to polymerize the phenolic condensation product. When the polymerizing step has been completed, the article is rigid and the convolutions are bonded together at the points of contact shown at numeral 20 in Figure 2. The pores or ducts 16 are not completely obstructed by the phenolic condensation product. The steps shown in Figures 3 and 4 may be combined into a single operation. An oven or an induction heating element can be placed around element 22 and mandrel 24 to heat said element to the proper polymerizing temperature as it moves along the mandrel. To obtain the desired porosity of the final element in the combined steps, the compression of element 22 is controlled by the force applied to the outer end by member 28.

In producing an oilless bearing, the pores or ducts 16 are filled with a lubricant or antifriction material either before or after the heat treating step. The type of substance used for the lubricant or antifriction material determines at which stage of the process the material will be incorporated in the structure. For example, graphite will easily withstand the temperatures required to polymerize the phenolic condensation products and therefore may be added either before or after the heat treating step. Paraffin can be added only after said step. In the oil type bearing the radial pores hold the lubricant in suspension and permit gradual feeding of the lubricant onto the bearing surface as needed. In this type of bearing the lubricant may be fed through bearing wall from the outside surface. There may be some applications of the present article in which fluid is fed from internal portion 18 through the pores to the outside surface.

In another method of producing the bearing or article, washers are cut from sheet material impregnated with the phenolic condensation product and then crimped to produce the radial rugosities shown in Figure 6. These washers are then assembled on a suitable stem or mandrel, such as that shown at numeral 30 in Figure 4, and are then heated to polymerize the phenolic condensation product and thus form an integral bearing body having the radial ducts or pores similar to those of the bearing formed by the method disclosed in Figures 3 and 4. The pores of this body may then be filled with a suitable lubricant or antifriction material in the same manner as that previously described herein.

Various changes in the arrangement of the present construction and in the methods of making said article may be made to suit requirements.

I claim:

1. In a method of making fibrous bearings, the steps of winding a fibrous ribbon impregnated with a synthetic resin and having transverse rugosities, around a mandrel in a substantially edgewise manner to form a cylindrical element having radial pores therein; heating the element so formed to harden said resin; and filling said pores with a lubricant.

2. In a method of making bearings, the steps of winding a fibrous ribbon impregnated with a phenolic condensation product and having transverse rugosities therein, around a mandrel in a substantially edgewise manner to form a cylindrical element having radial pores therein; applying endwise pressure to said element; heating the element while under said pressure for a time and temperature sufficient to polymerize said phenolic condensation product, and impregnating said element with a lubricant.

3. In a method of making bearings, the steps of winding a fibrous ribbon impregnated with a phenolic condensation product and having transverse rugosities therein, around a mandrel in a substantially edgewise manner to form a cylindrical element having radial pores therein; applying endwise pressure to said element; heating the element while under said pressure for a time and temperature sufficient to polymerize said phenolic condensation product, and thereafter filling said pores with a graphitic composition.

4. A method of making tubular articles, comprising cutting layers from sheet material impregnated with a synthetic resin and having a rugose surface, arranging said layers face-to-face to form a tubular article, heating the article for a time and at a temperature sufficient to harden said resin, and filling said pores with a lubricant.

5. A method of making bearings, comprising cutting washer-shaped layers from sheet material impregnated with a synthetic resin and having a rugose surface, arranging said layers face-to-face to form a tubular article, heating the article while it is under pressure for a time and at a temperature sufficient to harden said resin, and impregnating said article with a lubricant.

6. A method of making tubular articles, comprising forming sheet material impregnated with a resin and having a rugose surface into a tubular article with at least a portion of the rugosities forming radial pores, heating the articles for a time and at a temperature sufficient to harden said resin, and filling said pores with a lubricant.

7. A method of making bearings using creped sheet material impregnated with a synthetic resin, comprising slitting said material in a direction transverse to the rugosities thereon into ribbon of a width substantially equal to the thickness of the wall of the completed bearing, winding said ribbon in a substantially edgewise manner to form a hollow cylindrical article having radial pores therein, heating the article while it is under pressure at a temperature and for a time sufficient to harden said resin, and filling said pores with a lubricant.

References Cited in the file of this patent

UNITED STATES PATENTS

| 1,769,950 | Hensley | July 8, 1930 |
| 2,025,830 | Rosmait | Dec. 31, 1935 |
| 2,268,703 | Dickey | Jan. 6, 1942 |
| 2,324,083 | Holmes | July 13, 1943 |
| 2,375,263 | Upper | May 8, 1945 |

FOREIGN PATENTS

| 379,629 | Great Britain | Sept. 1, 1932 |
| 384,343 | Great Britain | Dec. 8, 1932 |
| 407,876 | Great Britain | Mar. 29, 1934 |